United States Patent
Katayama

(10) Patent No.: US 9,813,232 B2
(45) Date of Patent: Nov. 7, 2017

(54) DEVICE AND METHOD FOR RESISTING NON-INVASIVE ATTACKS

(71) Applicant: Cypress Semiconductor Corporation, San Jose, CA (US)

(72) Inventor: Toru Katayama, Kanagawa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/659,924

(22) Filed: Mar. 17, 2015

(65) Prior Publication Data

US 2016/0277184 A1    Sep. 22, 2016

(51) Int. Cl.
*H04L 29/06*    (2006.01)
*H04L 9/00*    (2006.01)
*G06F 7/523*    (2006.01)

(52) U.S. Cl.
CPC .............. *H04L 9/002* (2013.01); *G06F 7/523* (2013.01); *H04L 2209/08* (2013.01)

(58) Field of Classification Search
CPC .......................... H04L 9/0869; H04L 2209/24
See application file for complete search history.

(56) References Cited

U.S. PATENT DOCUMENTS

| | | | | |
|---|---|---|---|---|
| 3,551,663 A * | 12/1970 | Herron | ............. | G06F 7/4985 708/518 |
| 5,261,003 A * | 11/1993 | Matsui | ............. | H04L 9/0625 380/264 |
| 5,513,133 A * | 4/1996 | Cressel | ............. | G06F 7/728 708/491 |
| 5,548,648 A * | 8/1996 | Yorke-Smith | ......... | H04L 9/0869 380/29 |
| 5,778,074 A * | 7/1998 | Garcken | ............. | H04L 9/0618 380/28 |
| 5,784,305 A * | 7/1998 | Nadehara | ............. | G06F 7/5443 708/523 |
| 5,898,604 A * | 4/1999 | Winterer | ............. | G06F 7/5324 708/625 |
| 6,167,421 A * | 12/2000 | Meeker | ............. | G06F 7/5334 708/626 |
| 6,185,304 B1 * | 2/2001 | Coppersmith | ......... | H04L 9/002 380/259 |
| 6,213,877 B1 * | 4/2001 | Walker | ............. | G07F 17/3244 463/22 |
| 6,804,354 B1 * | 10/2004 | Driscoll | ............. | H04L 9/0668 380/28 |
| 7,616,766 B2 * | 11/2009 | Ogihara | ............. | H04L 9/085 380/28 |
| 8,088,001 B2 * | 1/2012 | Preisach | ............. | G06Q 30/02 463/16 |
| 8,265,267 B2 * | 9/2012 | Futa | ............. | G06F 7/723 380/28 |
| 8,667,043 B2 * | 3/2014 | Wiencke | ............. | G06F 7/5306 708/626 |
| 2002/0124219 A1 * | 9/2002 | Kuroki | ............. | G01R 31/3183 714/739 |

(Continued)

*Primary Examiner* — Izunna Okeke
*Assistant Examiner* — Sher A Khan

(57) ABSTRACT

A device and method for resisting, non-invasive attacks are disclosed herein. The device includes a random number generator that generates a random number, and a multiplier that multiplies first data and second data in a unit of a bit length determined based on the random number.

6 Claims, 13 Drawing Sheets

(56) References Cited

U.S. PATENT DOCUMENTS

| | | | |
|---|---|---|---|
| 2003/0054875 A1* | 3/2003 | Marks | G07F 17/3244 463/20 |
| 2005/0002531 A1* | 1/2005 | Michaelsen | G06F 21/602 380/268 |
| 2005/0174909 A1* | 8/2005 | Horigome | G11B 7/0053 369/53.21 |
| 2005/0182813 A1* | 8/2005 | Cho | G06F 7/5324 708/620 |
| 2005/0216754 A1* | 9/2005 | Ehud | G06F 21/6209 713/193 |
| 2007/0255941 A1* | 11/2007 | Ellis | H04L 9/0662 713/151 |
| 2009/0067617 A1* | 3/2009 | Trichina | G06F 7/723 380/28 |
| 2009/0086961 A1* | 4/2009 | Sauzet | G06F 7/728 380/28 |
| 2009/0111556 A1* | 4/2009 | Moody | G07F 17/32 463/20 |
| 2009/0214024 A1* | 8/2009 | Schneider | H04L 9/0625 380/28 |
| 2011/0282924 A1* | 11/2011 | Mallinson | H03H 15/00 708/3 |
| 2013/0094650 A1* | 4/2013 | Mendel | H04L 9/002 380/255 |
| 2013/0262544 A1* | 10/2013 | Lee | G06F 7/533 708/250 |
| 2014/0108786 A1* | 4/2014 | Kreft | G06F 21/71 713/156 |
| 2014/0274348 A1* | 9/2014 | Baerlocher | G07F 17/3244 463/26 |
| 2015/0063561 A1* | 3/2015 | Teglia | H04L 9/002 380/28 |
| 2015/0288520 A1* | 10/2015 | Jacobson | H04L 9/3066 380/28 |
| 2016/0189487 A1* | 6/2016 | Arnone | G07F 17/3288 463/25 |
| 2016/0277184 A1* | 9/2016 | Katayama | H04L 9/0869 |

* cited by examiner (1) WHEN $b_{w}=1$ (2) WHEN $b_{w}=2$

FIG. 1C (3) WHEN $b_w=3$

| $a_3$ | $a_2$ | $a_1$ | $a_0$ | ←a |

× | $b_3$ | $b_2$ | $b_1$ | $b_0$ | ←b $b_2b_1b_0 \times a$
$00b_3 \times a$ } PARTIAL PRODUCT $b \times a$

FIG. 1D (4) WHEN $b_w=4$

| $a_3$ | $a_2$ | $a_1$ | $a_0$ | ←a

× | $b_3$ | $b_2$ | $b_1$ | $b_0$ | ←b $b \times a$

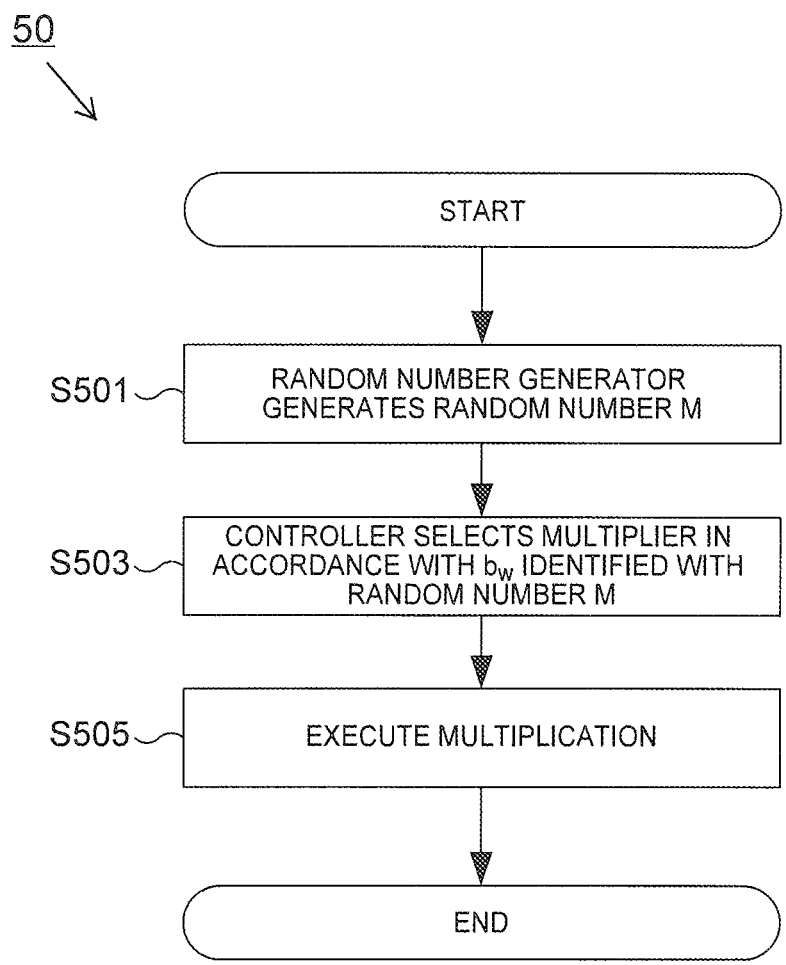

FIG. 6A

EXPONENTIATION OPERATION WITHIN RSA OPERATION:
EXECUTE EXPONENTIATION OPERATION OF $Q \equiv P^{\wedge}k \bmod n$ BY BINARY METHOD Input: $P$, $k=(k_{n-1}, k_{n-2},\ldots k_0)_2$ Output: $Q = P^k$

1: $Q = 1$

2: for $i = n-1$ to $0$ do

3:     $Q = Q \times Q$     // square

4:     if($k_i = 1$) then

5:        $Q = Q \times P$     // multiply

6: return $Q$

FIG. 6B

EXECUTE $Q \times Q$, $Q \times P$ IN BINARY METHOD BY MULTI-PRECISION MULTIPLICATION Input: $a = \{a[s-1], a[s-2], \ldots a[0]\}$
        $b = \{b[s-1], b[s-2], \ldots b[0]\}$ Output: $a \times b$ 1: $t = 0$ 2: for $i = 0$ to $s-1$

3:     $C = 0$

4:     for $j = 0$ to $s-1$

5:        $(C, S) = t[i+j] + a[j] \times b[i] + C$

6:        $t[i+j] = S$

7:     $t[i+s] = C$

\* $a[j]$, $b[i]$ ARE WORDS OF BIT LENGTH $w$ (e.g., $w=8, 16, 32$)
\* EACH $a$, $b$ INCLUDES $s$ WORDS (e.g., $s=16, 32, 64$)

FIG. 7

TYPICAL BINARY MULTIPLIER $\in GF(2^m)$

Input:
   $a = (a_{m-1}, a_{m-2}, \ldots a_0)$, $a \in GF(2^m)$
   $b = (b_{m-1}, b_{m-2}, \ldots b_0)$, $b \in GF(2^m)$
   $m(x) = x^m + r(x)$, $\deg r(x) \leq m-1$
   ($m(x)$: irreducible polynomial)

Output: $c = a \times b$

1: $c = 0$
2: for $i = m-1$ to $0$ do
3:     $c = \text{leftshift}(c) + c_{m-1} r(x)$
4:     $c = c + b_i a$
5: return $c$

FIG. 8

BINARY MULTIPLIER WITH VARIABLE MULTIPLICATION bit WIDTH $\in GF(2^m)$

Input:
  $a = (a_{m-1}, a_{m-2}, \ldots a_0)$, $a \in GF(2^m)$
  $b = (b_{m-1}, b_{m-2}, \ldots b_0)$, $b \in GF(2^m)$
  $m(x) = x^m + r(x)$, deg $r(x) \leq m-1$ ($m(x)$: irreducible polynomial)

n: number of bits from b to be used in multiplication,
  i.e. value (indirectly) selected by RNG, $n \geq 1$ Output: $c = a \times b$ Preprocessing 0: bwb = m          // bwb: bit width of b 1: if bwb is not a multiple of n 2:    tmp = b with zeros added to MSB
              until bit width of b is a multiple of n 3:    b = tmp 4:    bwb = bit width of tmp
              (includes leading zeros added to MSB)

Algorithm

1: c = 0, i = bwb - 1

2: while i ≥ 0 do

3:    for j=1 to n

4:        c = leftshift(c) + $c_{m-1}r(x)$

5:        c = c + bia

6:        i = i - 1

7:        j = j + 1

8: return c

FIG. 9

ECC OPERATION: EXECUTE Q ≡ kP BY BINARY METHOD (PRIME FIELDS)

Input: P, $k=(k_{n-1}, k_{n-2},...k_0)_2$

Output: Q = kP

1: Q = 1

2: for i = n-1 to 0 do

3:     Q = Q + Q        // point doubling

4:     if($k_i$= 1) then

5:         Q = Q + P    // point addition

6: return Q

FIG. 10A

POINT DOUBLING $X3 = 2 * Y1 * Z1 * (w\textasciicircum 2 - 8 * X1 * Y1\textasciicircum 2 * Z1) \bmod p$ $Y3 = 4 * Y1\textasciicircum 2 * Z1 * (3 * w * X1 - 2 * Y1\textasciicircum 2 * Z1) - w\textasciicircum 3 \bmod p$ $Z3 = 8 * (Y1 * Z1)\textasciicircum 3 \bmod p$ where $w = 3 * X1\textasciicircum 2 + a * Z1\textasciicircum 2 \bmod p$.

FIG. 10B

POINT ADDITION $X3 = v * (Z2 * (Z1 * u\textasciicircum 2 - 2 * X1 * v\textasciicircum 2) - v\textasciicircum 3) \bmod p$ $Y3 = Z2 * (3 * X1 * u * v\textasciicircum 2 - Y1 * v\textasciicircum 3 - Z1 * u\textasciicircum 3) + u * v\textasciicircum 3 \bmod p$ $Z3 = v\textasciicircum 3 * Z1 * Z2 \bmod p$ where $u = Y2 * Z1 - Y1 * Z2 \bmod p$ and $v = X2 * Z1 - X1 * Z2 \bmod p$.

FIG. 11

RSA OPERATION BY MONTGOMERY REDUCTION

```
1:  for i = 0 to s-1
2:      C := 0
3:      for j = 0 to s-1
4:          (C, S) := t[i+j] + a[j]*b[i] + C
5:          t[i+j] = S
6:      t[i+s] = C
7:  for i = 0 to s-1
8:      C := 0
9:      m := t[i]* n'[0] mod W
10:     for j = 0 to s-1
11:         (C, S) := t[i+j] + m*n[j] + C
12:         t[i+j] = S
13:     ADD (t[i+s], C)
14: for j = 0 to s
15:     u[j] := t[j+s]
16: B := 0
17: for i = 0 to s-1
18:     (B, D) := u[i] - n[i] - B
19:     t[i] := D
20: (B, D) := u[s] - B
21: t[s] := D
22: if B=0 then return t[0], t[1], ..., t[s-1]
              else return u[0], u[1], ..., u[s-1]
```

DEVICE AND METHOD FOR RESISTING NON-INVASIVE ATTACKS

BACKGROUND

Field

The present invention generally relates to a device and a method for resisting non-invasive attacks.

For secure transmission and/or storage of confidential data, various cryptographic systems have been considered. Cryptographic systems may be used to prevent unauthorized third parties from accessing the confidential data. An encryption method of such cryptographic systems may include dividing the confidential data to be encrypted into data segments that may be of varying length for secure transmission and/or storage as disclosed in, for example, JP07-281596 A.

However, such encryption method does not provide any countermeasure against decrypting methods known as non-invasive attacks. Non-invasive attack is a technique to detect information that may be analyzed externally, such as voltage and radiation electromagnetic waves from a computing chip for operations such as multiplication, subtraction, and the like, without physically damaging the computing chip or the like. Even though data segments of the confidential data to be encrypted may be of varying lengths, codes or decryption may be analyzed by such non-invasive attacks if algorithmic pattern of the encryption is fixed.

SUMMARY

Described herein are embodiments of a device and a method for resisting non-invasive attacks.

According to an embodiment, a device for cryptographic implementation includes a random number generator and a multiplier. The random number generator may be configured to generate a random number and the multiplier may be configured to multiply a first data and a second data in a unit of a bit length determined based on the random number.

According to another embodiment, a method for cryptographic implementation by a device includes generating a random number and multiplying a first data and a second data. The first data and the second data in a unit of a bit length determined based on the random number.

Further features and advantages of the present disclosure, as well as the structure and operation of various embodiments of the present disclosure, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

FIGS. 1A-1D illustrates, multiplication operations of conventional computing devices.

FIG. 5 illustrates a flow chart for an example operation of the computing device of FIG. 4, according to an embodiment.

FIGS. 6A-6B and 7-9 are illustrations of a program code for cryptographic operation of a computing device, according to various embodiments.

FIGS. 10A and 10B illustrate a part of the processing of the program code of FIG. 9, according to an embodiment.

FIG. 11 illustrates a program code for cryptographic operation of a computing device, according to an embodiment.

Figure 1A:
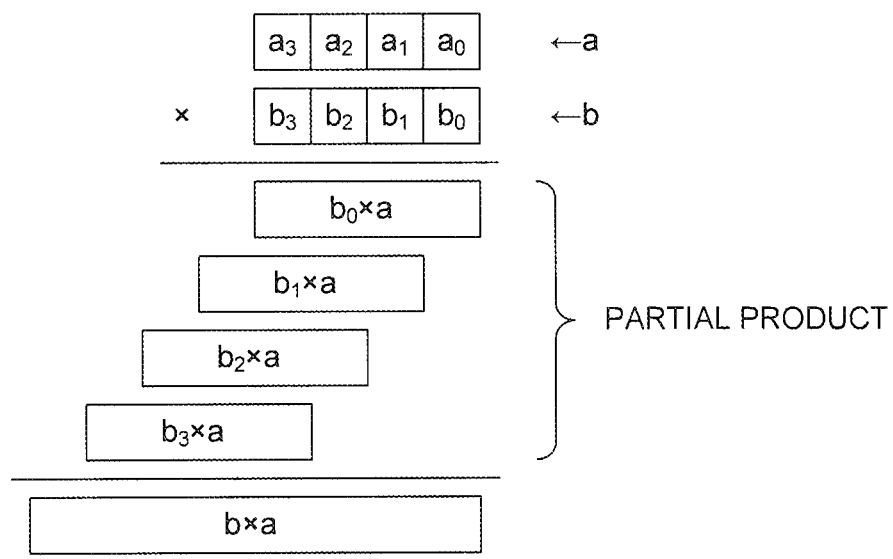

The present disclosure will now be described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

In other words, the following embodiments are illustrated for describing the present invention, and the present invention is not limited to the embodiments. Furthermore, the present invention may be modified in various ways insofar as they do not deviate from the scope of the invention. Moreover, a positional relation such as up, down, left and right may be based on the positional relation as is illustrated in the drawings, unless otherwise specifically indicated. A dimensional ratio in the drawings is not limited to the shown ratio.

Overview

The present invention relates to a computing device that may be configured to perform multiplication using a multiplier. The computing device may be used to perform multiplication with a random width in a cryptographic operation. Such multiplication operation may allow the computing device to have a countermeasure against non-invasive attacks to the cryptographic operation.

FIGS. 1A-1D illustrates multiplication operations of conventional computing devices. The following describes the case of multiplication of 4-bit multiplicand a and 4-bit multiplier b.

Multiplication operation is typically performed using a fixed bit width (hereinafter the bit width for computing is referred to as $b_w$). FIG. 1A illustrates a multiplication operation where $b_w$ is 1 bit. Considering $a=\{a_3, a_2, a_1, a_0\}$ and $b=\{b_3, b_2, b_1, b_0\}$ and partial products $a \times b_0$, $a \times b_1$, $a \times b_2$, and $a \times b_3$, the product of $a \times b$ may be represented as the value that is obtained by shifting the partial products $a \times b_1$, $a \times b_2$, and $a \times b_3$ by one-bit with respect to the partial products $a \times b_0$, $a \times b_1$, and $a \times b_2$, respectively, and adding the partial products together, i.e., as $a \times b_0 \times 2^0 + a \times b_1 \times 2^1 + a \times b_2 \times 2^2 + a \times b_3 \times 2^3$.

Figure 1B:
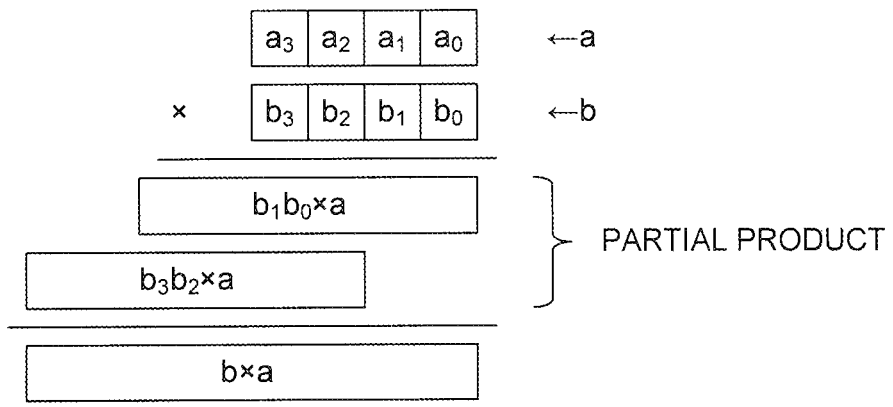

FIG. 1B illustrates a multiplication operation where $b_w$ is 2 bits. In FIG. 1B, the product of $a \times b$ is shown to be calculated as $a \times b_1 b_0 \times 2^0 + a \times b_3 b_2 \times 2^2$ using $a \times b_1 b_0$ and $a \times b_3 b_2$ as partial products thereof.

FIG. 1C illustrates a multiplication operation where $b_w$ is 3 bits. In FIG. 1C, the product of $a \times b$ is shown to be calculated as $a \times b_2 b_1 b_0 \times 2^0 + a \times 00 b_3 \times 2^3$ using $a \times b_2 b_1 b_0$ and $a \times 00 b_3$ as partial products thereof.

FIG. 1D illustrates a multiplication operation where $b_w$ is 4 bits. In FIG. 1D, the product $a \times b$ is shown to be calculated at one time without dividing it into partial products.

In the case of such multiplication operations performed with a fixed bit width, a multiplier outputs a fixed bit pattern, which may lead to the possibility of a cryptographic operation being decoded by an unauthorized user by analyzing the pattern of voltage, radiation electromagnetic waves and the like of the output fixed bit pattern.

To overcome such non-invasive attacks, a computing device may be configured to calculate a partial product with a random bit width that is selected in accordance with a random number for multiplication operation, according to an embodiment. This configuration may help to randomize the bit pattern output by the multiplier, and so may help to suppress non-invasive attacks.

A Computing Device According to a First Embodiment

Figure 2:
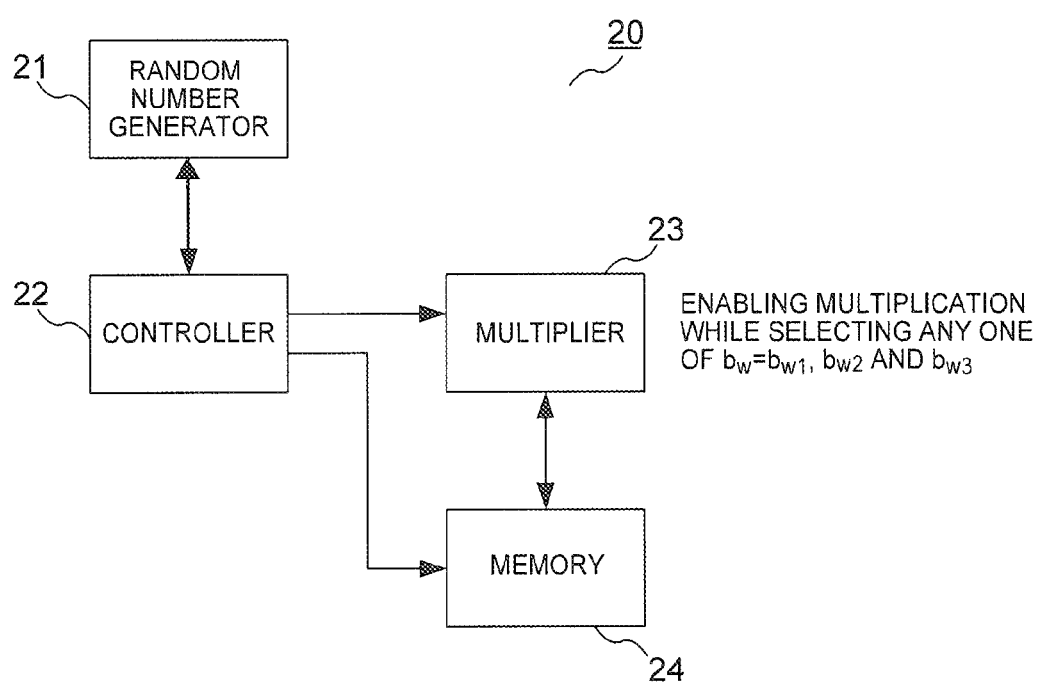
FIG. 2 illustrates a block diagram of a computing device, according to an embodiment.

FIG. 2 illustrates a block diagram of a computing device 20, according to an embodiment. Computing device 20 may include a random number generator 21, a controller 22, a multiplier 23, and a memory 24, according to an example of this embodiment. Random number generator 21, controller 22, and multiplier 23 may be implemented as hardware such as a dedicated semiconductor device or semiconductor integrated circuit, or may be implemented as a program (software).

According to an example of this embodiment, random number generator 21 may be configured to generate a random number in response to a request from controller 22. In another example, controller 22 may be configured to determine a bit width $b_w$ in accordance with the random number generated by random number generator 21. Bit width $b_w$ may be a unit of the operation by multiplier 23.

In a further example, multiplier 23 may be configured to read a multiplicand and a multiplier from memory 24, and multiply them. During the multiplication, multiplier 23 may be configured to divide at least one of the multiplicand and the multiplier into a partial unit of bit width $b_w$, and multiply them for every partial unit. Multiplier may be divided into partial units of bit width $b_w$, where the multiplicand and the multiplier have a length of w, such that $w \geq b_w$ may hold.

Multiplier 23 may be configured to deal with $b_w$ including a plurality of multiplication units. In FIG. 2, multiplier 23 is shown to deal with three multiplication units of $b_{w1}$, $b_{w2}$ and $b_{w3}$, according to an example of this embodiment. It should be noted that the number of multiplication units dealt by multiplier 23 is not limited to three, but may be two or four or more.

According to an example of this embodiment, memory 24 may be a storage medium that may be configured to temporarily store the multiplicand, the multiplier and intermediate data made during the calculation process, as targets of the multiplication.

An Example Operation of a Computing Device According to a Second Embodiment

Figure 3:
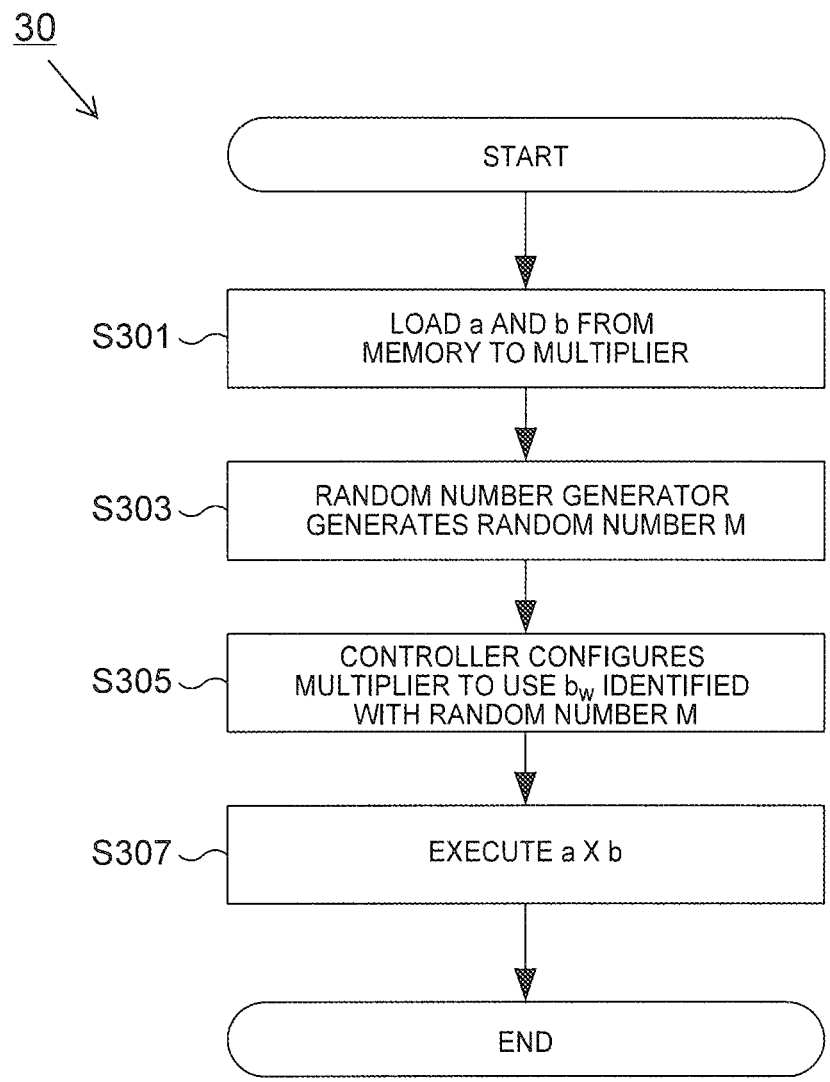
FIG. 3 illustrates a flow chart for an example operation of the computing device of FIG. 2, according to an embodiment.

FIG. 3 illustrates a flow chart 30 for an example multiplication operation of a computing device (e.g., computing device 20 as described in FIG. 2). Solely for illustrative purposes, the steps illustrated in FIG. 3 will be described with reference to computing device 20, as described in FIG. 2.

The operation steps described below may be executed in any order changed or in parallel within the range of being consistent with the operation. Another step may be added between the operation steps. A step that is described as one step for convenience may be executed as a plurality of steps, and steps that are described as a plurality of steps for convenience may be executed as one step.

At the start of the operation of FIG. 3, a multiplicand a and a multiplier b are stored in a memory (e.g., memory 24).

In step S301, a multiplier (e.g., multiplier 23) reads a multiplicand a and a multiplier b from the memory.

In step S303, a random number generator (e.g., random number generator 21) generates a random number M. The order of steps S301 and S303 may be reversed, according to an example of this embodiment.

In step S305, a controller (e.g., controller 22) determines bit width $b_w$ for multiplication operation in accordance with the random number M and sets the determined bit width $b_w$ at the multiplier for operation.

In step S307, the multiplier multiplies the multiplicand a and the multiplier b with the set bit width $b_w$.

It should be noted that the above description of the example multiplication operation should not be construed to limit the description of computing device 20 described above.

A Computing Device According to a Third Embodiment

Figure 4:
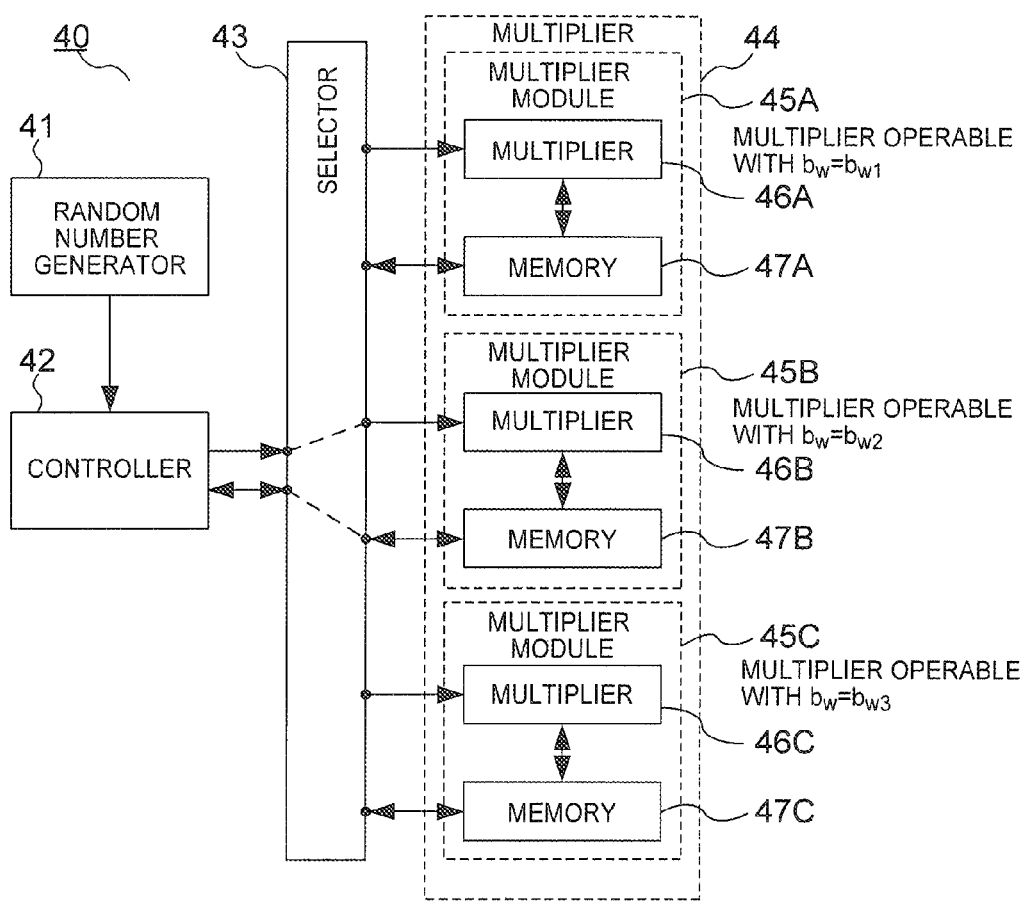
FIG. 4 illustrates a block diagram of a computing device, according to another embodiment.

FIG. 4 illustrates a block diagram of a computing device 40, according to an embodiment. Computing device 40 may include a random number generator 41, a controller 42, a selector 43, and a multiplier 44, according to an example of this embodiment. Random number generator 41, controller 42, selector 43, and multiplier 44 may be implemented as hardware such as a dedicated semiconductor device or semiconductor integrated circuit, or may be implemented as a program (software).

Similarly to random number generator 21 of computing device 20 in FIG. 2, random number generator 41 may be configured to generate a random number in response to a request from controller 42, according to an example of this embodiment. In another example, controller 42 may be configured to determine a bit width b,in accordance with the random number generated by random number generator 41. The bit width $b_w$ may be a unit of the operation of multiplier 44. This operation has the same meaning as a determination as to which multiplier module among a plurality of multiplier modules 45A to 45C of multiplier 44 is to be selected.

Multiplier 44 may include multiplier modules 45A, 45B, and 45C, according to an example of this embodiment. Multiplier modules 45A, 45B, and 45C may include multiplier 46A and memory 47A, multiplier 46B and memory 47B, and multiplier 46C and memory 47C, respectively. Even though FIG. 4 shows multiplier 44 including three multiplier modules 45A, 45B, and 45C, it should be noted that the present disclosure is not so limiting, and the number of multiplier modules included in multiplier 44 may be two or four or more. Hereinafter multiplier modules 45A to 45C may be collectively called a multiplier module 45. Also, multipliers 46A to 46C and memories 47A to 47C may be collectively called multiplier 46 and memory 47, respectively.

In an example embodiment, controller 42 may be configured to provide one or more control signals (e.g., control signals 48, 49) to selector 43. Based on the one or more control signals, selector 43 may be configured to select a multiplier module from multiplier modules 45A to 45C in accordance with the bit width $b_w$ determined by controller 42. In the example embodiment. FIG. 4 illustrates selection of multiplier module 45B using selector 43.

Multipliers 46A to 46C may be configured to read a multiplicand and a multiplier from the corresponding memories 47A to 47C and multiply them. In an example, multipliers 46A to 46C may be configured to divide multipliers read from memories 47A to 47C into partial units of fixed bit widths $b_{w1}$, $b_{w2}$ and $b_{w3}$ having lengths different from each other, and perform multiplications using partial products. According to an example of this embodiment, multiplicand a and multiplier b may have a bit width of w and $b_{w1}$, $b_{w2}$ and $b_{w3}$ may be integers that are equal to 1 or greater than 1, but equal to w or less than w.

In an example of this embodiment, controller 42, and selector 43 may select one of multiplier modules 45A to 45C in accordance with a random number M generated by random number generator 41, and so one of multipliers 46A to 46C may perform multiplication operation with the bit width corresponding to any one of selected multiplier modules 45A to 45C, i.e., with a random bit width.

In another example of this embodiment, memories 47A to 47C may be configured to be a storage medium that temporarily stores the multiplicand and the multiplier as targets of the multiplication operation.

An Example Operation of a Computing Device According to a Fourth Embodiment

FIG. 5 illustrates a flow chart 50 for an example operation of a computing device (e.g., computing device 40 as described in FIG. 4). Solely for illustrative purposes, the steps illustrated in FIG. 5 will be described with reference to computing device 40, as described in FIG. 4.

The operation steps described below may be executed in any order changed or in parallel within the range of being consistent with the operation. Another step may be added between the operation steps. A step that is described as one step for convenience may be executed as a plurality of steps, and steps that are described as a plurality of steps for convenience may be executed as one step.

In step S501, a random number generator (e.g., random number generator 41) generates a random number M in response to a request from a controller (e.g., controller 42).

In step S503, the controller determines the bit width b, and a multiplier module of a plurality of multiplier modules (e.g., multiplier modules 45A to 45C) for multiplication operation in accordance with the random number M, and a selector (e.g., selector 43) selects the multiplier module determined by the controller.

In step S505, a multiplier corresponding to the selected multiplier module reads a multiplicand and a multiplier from the corresponding memory and the multiplier performs multiplication operation for the read multiplicand and multiplier with the bit width $b_w$. For example, in case multiplier module 45B is selected in step S503, multiplier 46B may read a multiplicand and a multiplier from memory 47B and perform multiplication operation for the multiplicand and the multiplier.

Example Applications of a Computing Device According to Various Embodiments

The following describes examples of cryptographic operation that may be performed using a computing device (e.g., computing devices 20 and/or 40).

RSA Operation: Exponentiation Operation of $Q \equiv P^k \bmod n$

FIGS. 6A and 6B illustrate an example program code that may be used for RSA operation, according to an embodiment. FIG. 6A illustrates an example program code where the exponentiation operation of RSA may be implemented by a binary method, according to an example of this embodiment. The exponentiation operation in FIG. 6A may include two multiplications, "Q=Q×Q" indicated with broken lines on the third line of the program code and "Q=Q×P" indicated with broken lines on the fifth line. In an example, P may be an input data and Q may be an output data.

FIG. 6B illustrates an example program code that may be used to implement a sub-process (e.g Q×Q and Q×P) included in the example program code of FIG. 6A by multi-precision multiplication, according to another example of this embodiment. FIG. 6B shows the details of the multiplications in the broken lines of FIG. 6A, and includes the multiplication of a[j]×b[i] indicated with broken lines on the fifth line of FIG. 6B. In this way, the computing device (e.g., computing devices 20 and/or 40) performing random-width (varying width) multiplication may select a bit width $b_w$ as the multiplication unit at one of the following three timings, for example, in accordance with the random number M generated by random number generator (e.g., random number generator 21 and/or 41).

(1) Starting time when binary method is executed, where an example of the binary method is shown in FIG. 6A;

(2) Any timing to execute at least one of "Q=Q×Q" and "Q=Q×P"; and (3) Timing of setting j=0 or timing when j is changed in the multi-precision multiplication, where an example of the multi-precision multiplication is shown in FIG. 6B.

Thus, the selected bit width $b_w$ may be used for multiplication "a[j]×b[i]" by the computing device.

Binary Multiplier

There are two types of multipliers that are widely used for public key cryptographic implementation: multipliers in prime fields and multipliers in binary fields. The above example describes the multiplication in the prime fields GF(p). The multiplication with a random (varying) bit width as stated above may be performed in the multiplication in the binary fields $GF(2^m)$ as well.

FIG. 7 illustrates an example program code that may be used in the operation by a typical binary multiplier. In the example of FIG. 7, multiplication may be performed with the fixed width of one bit that may be shifted to the left. When such processing of the program code is implemented by hardware, the for loop i operation may be processed in one clock for each value of variable i. Then the value c on the left side on the fourth line may be stored in a register.

Yet in another embodiment, FIG. 8 illustrates an example program code that may be used in the operation of a multiplier, where the multiplication bit width may be variable. In the example of FIG. 8, the bit width n of the multiplier b used for the operation may be variable in accordance with a value generated by a random number generator RNG (e.g., random number generator 21 and/or 41).

At preprocessing portion of the example program code shown in FIG. 8, '0' may be added for adjustment at the beginning so that the length bwb of the multiplier b may become an integral multiple of the selected bit width n.

At algorithm portion of the example program code, the binary multiplication in

FIG. 8 may be executed with the bit width n that may be randomly changed. When this example program code is implemented by hardware, the third to seventh lines of the algorithm portion including the for loop j may be processed in one clock from j=1 to j=n. Similar to the case of FIG. 7, the value c on the fifth line of the algorithm portion may be stored in a register when j=n. In the case of n=1, the operation of FIG. 8 may be the same as in FIG. 7.

Elliptic Curve Cryptography (ECC) Operation: Operation of Q=kP

For Q=kP that may be used for ECC in prime fields, the multiplication with a random bit width may be used as shown above with reference to FIG. 6B. FIG. 9 illustrates an example program code when Q=kP operation for ECC in prime fields may be implemented by a binary method, according to an embodiment.

According to an example of this embodiment, in the ECC operation, the parts of "Q=Q×Q" and "Q=Q×P" in the binary method for RSA (the third and fifth lines in FIG. 6A) may be changed as "Q=Q+Q" and "Q=Q+Q+P" (the third and fifth lines in FIG. 9). The operations of "Q=Q+Q" and "Q=Q+P" may be implemented by the operations of point doubling, as shown in FIG. 10A, and point addition, as shown in FIG. 10B, respectively. In FIG. 10A and FIG. 10B, the "^" denotes exponentiation, and "*" denotes multiplication. In this way, the exponentiation and the multiplication shown in FIGS. 10A and 10B may be performed using the computing device according to the present embodiment that performs multiplication operation with a random bit width.

The operational techniques shown in FIGS. 10A and 10B are described in McGrew, D., Igoe, K., Salter, M., "Fundamental Elliptic Curve Cryptography Algorithms", RFC 6090, February 2011 (http://tools.ietf.org/html/rfc6090), which is incorporated herein by reference in its entirety.

When Q=kP operation for ECC in binary fields is implemented by a binary method, the program code may be similar to the example program code of FIG. 9, and so the random width multiplier such as described in FIG. 8 may be used similarly, according to an embodiment. In this case, the operation of point doubling and point addition in FIG. 10A and FIG. 10B may be different than in the case of Q=kP operation for ECC in prime fields.

RSA Operation By Montgomery Reduction

A computing device (e.g., computing device 20 and/or 40) that performs multiplication with a random bit width may be used for RSA operation based on Montgomery reduction, according to an embodiment. FIG. 11 illustrates an example program code that may be used to implement RSA operation based on Montgomery reduction, according to an embodiment. The example program code shown in FIG. 11 is described in Cetin Kaya Koc, Tolga Acar, Burton S. Kaliski Jr., "Analyzing and Comparing Montgomery Multiplication Algorithms", IEEE Micro, 16(3): 26-33, June 1996, which is incorporated herein by reference in its entirety.

In the example program code of FIG. 11, the first to sixth lines correspond to the multi-precision multiplication of FIG. 6B. The seventh line or later shows the example program code that may be used to implement mod n in the RSA operation. As indicated with broken lines, the example program code of FIG. 11 includes three multiplications "a[j]*b[i]," "t[i]*n'[0]," and "m*n[j]." In this way, the multiplication operation with a random bit width according to the present embodiment may be used for these multiplications.

Example Computer System

Figure 12:
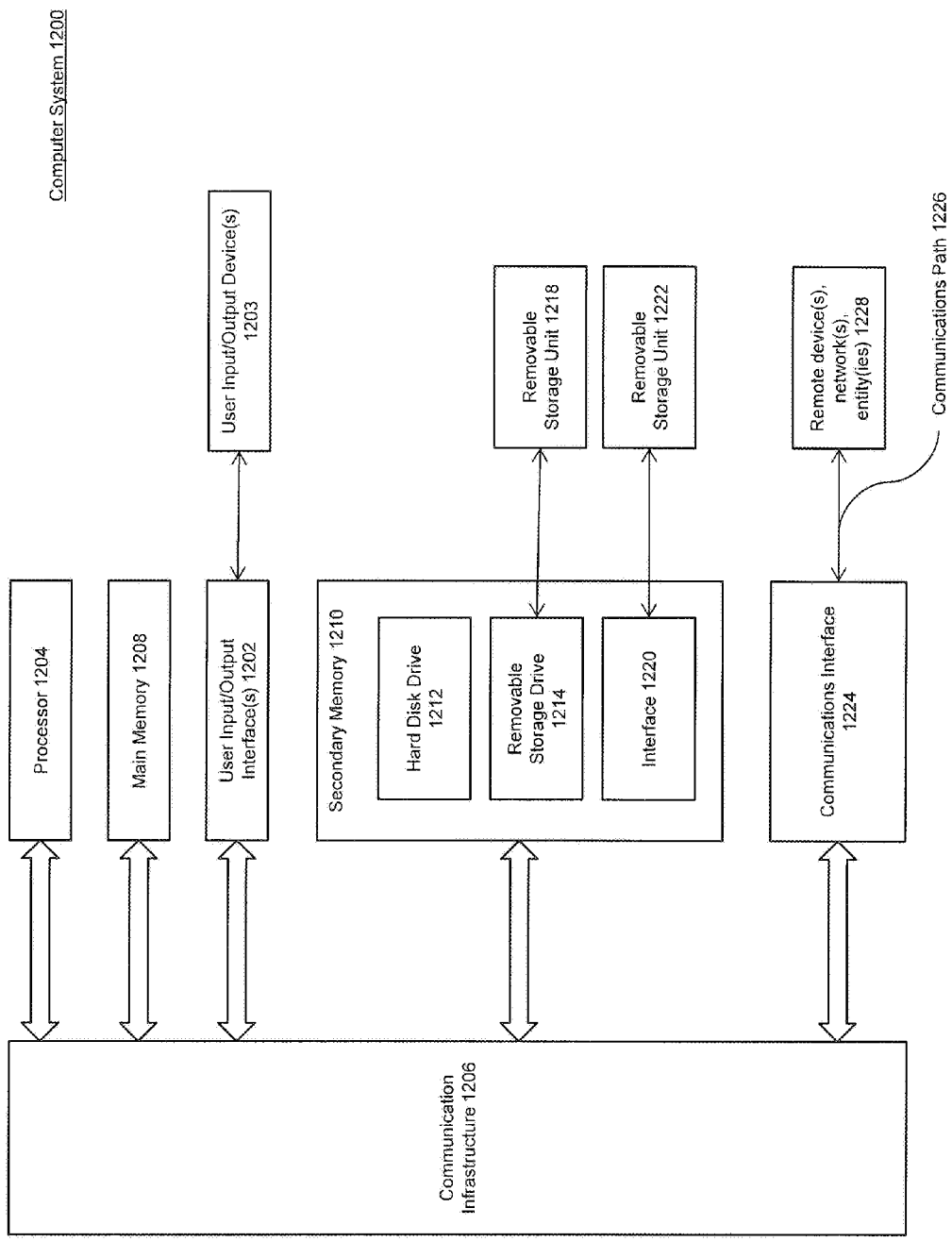
FIG. 12 illustrates a block diagram of a computer system in which embodiments of the present invention, or portions thereof, may be implemented.

Various embodiments may be implemented, for example, using one or more well-known computer systems, such as computer system 1200 shown in FIG. 12. For example, the methods illustrated by flowcharts 30 and 40 of FIGS. 3-4 and the examples of program code illustrated by FIGS. 6A-6B, 7-11, may be implemented in system 1200. Computer system 1200 may be any well-known computer capable of performing the functions described herein, such as computers available from Apple, HP, Dell, Toshiba, etc.

Computer system 1200 includes one or more processors (also called central processing units, or CPUs), such as a processor 1204. Processor 1204 is connected to a communication infrastructure or bus 1206. In one embodiment, processor 1204 may be configured to implement Trusted Platform Modules (TPMs) and/or encryption software. In another embodiment, the TPMs and/or encryption software may be independently implemented outside of the processor 1204. In another embodiment, processor 1204 may be configured to include a multiplier that may perform one or more of the functions discussed above with reference to FIGS. 2-5, 6A, 6B, 8, 9 and 11.

One or more processors 1204 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1200 also includes user input/output device(s) 1203, such as monitors, keyboards, pointing devices, etc., which communicate with communication infrastructure 1206 through user input/output interface(s) 1202

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a compact disk. DVD, optical storage disk, and/or any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 12. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure. or characteristic into other embodiments whether or not explicitly mentioned or described herein.

The breadth and scope of the invention should not be limited by any of the above-described exemplary embodiments, but should be defined only in accordance with the following claims and their equivalents.

The configurations of the aforementioned embodiments may be combined or the configurations may be partially exchanged. The configuration of the present invention is not limited to the foregoing embodiments, and may be variously modified within the scope of the present invention.

It is to be understood that the terms "unit," "means," "device," and "system" in the present specification do not simply refer to physical means, but include the cases where the function of such "unit." "means," "device," and "system" are implemented by software. Those skilled in the relevant art(s) will understand that the function of one "unit," "means," "device," and "system" may be implemented by two or more physical means or devices, and the functions of two or more "units," "means," "devices," and "systems" may be implemented by one physical unit or device.

What is claimed is:

1. A semiconductor device for performing cryptographic operations, the semiconductor device comprising:
   a random number generator circuit configured to generate a random number;
   a controller circuit coupled with the random number generator circuit and configured to determine a bit length based on the random number; and
   a multiplier circuit coupled with the controller circuit and configured to perform a multiplication operation within a cryptographic operation to multiply a multiplicand and a multiplier, wherein during the multiplication operation the multiplier circuit is configured to suppress a non-invasive attack by dividing the multiplier into partial units having the bit length determined based on the random number and to multiply the partial units based on the determined bit length, wherein the multiplier circuit comprises a plurality of multiplier modules, wherein the plurality of multiplier modules are configured to multiply in mutually different bit lengths, and wherein the controller circuit is further configured to select one multiplier module from the plurality of multiplier modules in accordance with the random number.

2. The semiconductor device of claim 1, wherein the multiplier circuit is configured to multiply a plurality of bit lengths.

3. The semiconductor device of claim 1, wherein the random number generator circuit is configured to generate a random number each time the multiplier circuit performs the multiplication operation.

4. A method for performing a cryptographic operation, the method comprising:
   generating a random number in a random number generator circuit;

in a controller circuit coupled with the random number generator circuit, determining a bit length based on the random number;

in a multiplier circuit coupled with the controller circuit, performing a multiplication operation within the cryptographic operation to multiply a multiplicand and a multiplier, wherein performing the multiplication operation comprises suppressing a non-invasive attack by dividing the multiplier into partial units having the bit length determined based on the random number and multiplying the partial units based on the determined bit length, wherein the semiconductor device comprises a plurality of multiplier modules, and wherein performing the multiplication operation within the cryptographic operation comprises the semiconductor device using the plurality of multiplier modules to multiply in mutually different bit lengths; and selecting, by the semiconductor device, one multiplier module from the plurality of multiplier modules in accordance with the random number.

5. The method of claim 4, wherein performing the multiplication operation within the cryptographic operation comprises multiplying in a plurality of bit lengths.

6. The method of claim 4, further comprising generating a random number each time the semiconductor device performs the multiplication operation.

* * * * *